(12) United States Patent
Li Pi Shan et al.

(10) Patent No.: US 8,785,554 B2
(45) Date of Patent: *Jul. 22, 2014

(54) CRYSTALLINE BLOCK COMPOSITES AS COMPATIBILIZERS

(75) Inventors: Colin Li Pi Shan, Pearland, TX (US);
Kim L. Walton, Lake Jackson, TX (US);
Gary R. Marchand, Lake Jackson, TX (US); Edmund M. Carnahan, Pearland, TX (US); Eddy I. Garcia-Meitin, Angleton, TX (US); Thomas Karjala, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/165,096

(22) Filed: Jun. 21, 2011

(65) Prior Publication Data

US 2011/0313108 A1    Dec. 22, 2011

Related U.S. Application Data

(60) Provisional application No. 61/356,990, filed on Jun. 21, 2010.

(51) Int. Cl.
*C08L 53/00*    (2006.01)
(52) U.S. Cl.
USPC .............................................. 525/88; 525/95

(58) Field of Classification Search
USPC ..................................................... 525/88, 95
See application file for complete search history.

(56) References Cited

U.S. PATENT DOCUMENTS

| | | | |
|---|---|---|---|
| 2003/0030040 A1* | 2/2003 | Luthern et al. ................. | 252/585 |
| 2004/0209021 A1* | 10/2004 | Shih ............................. | 428/34.2 |
| 2006/0199906 A1* | 9/2006 | Walton et al. ................. | 525/191 |
| 2007/0010616 A1 | 1/2007 | Kapur et al. | |
| 2008/0269412 A1 | 10/2008 | Carnahan et al. | |
| 2009/0105417 A1 | 4/2009 | Walton et al. | |
| 2011/0313107 A1 | 12/2011 | Shan et al. | |

FOREIGN PATENT DOCUMENTS

WO    2011041696 A1    4/2011

OTHER PUBLICATIONS

Busico et al. Macromolecules, 2003, 36, p. 3806-3808, Apr. 2003.*
Thompson et al; Physical Review Letters; 2000; p. 670-673; vol. 85; No. 3.
Zhou et al; Polymer Engineering and Science; 2007; p. 499-509; vol. 47; issue4.
PCT/US2011/041194 Intl Search Report and Written Opinion.

* cited by examiner

*Primary Examiner* — Jeffrey Mullis

(57) ABSTRACT

Embodiments of the invention provide crystalline block composites and their use as compatibilizers. The crystalline block composites comprise i) a crystalline ethylene based polymer; ii) a crystalline alpha-olefin based polymer and iii) a block copolymer comprising a crystalline ethylene block and a crystalline alpha-olefin block.

5 Claims, 9 Drawing Sheets

FTREF of CBC1

HTLC of CBC1

Blend A

Blend 1

IZOD Impact

Flexural Modulus

CRYSTALLINE BLOCK COMPOSITES AS COMPATIBILIZERS

CROSS-REFERENCE TO RELATED PATENT APPLICATIONS

This application claims priority from U.S. Provisional Application Ser. No. 61/356,990, filed Jun. 21, 2010. This application is also related to U.S. Provisional Patent Applications also filed Jun. 21, 2010 with Ser. Nos. 61/356,978 and 61/356,957. For purposes of United States patent practice, the contents of these applications are herein incorporated by reference in their entirety.

FIELD OF THE INVENTION

This invention relates to crystalline block composites and their use as polymer compatibilizers.

BACKGROUND OF THE INVENTION

Multiphase polymer blends are of major economic importance in the polymer industry. In general, commercial polymer blends consist of two or more polymers. In some cases, they may be combined with small amounts of a compatibilizer or an interfacial agent.

Polypropylene (PP) homopolymers or PP random copolymers provide the desirable stiffness and temperature resistance for many applications, but suffer from poor impact properties due to having a high Tg (5° C. for hPP). To overcome this deficiency, PP homopolymer is blended with PP copolymers and/or elastomers to improve its toughness, but at the expense of its modulus.

An improvement would be to blend PP with a tough crystalline material (such as high density polyethylene (HDPE)) that has a low Tg to improve the impact performance, without adversely affecting the modulus. Unfortunately, blends of polypropylene and most polyethylenes are incompatible and result in immiscible blends with poor mechanical and optical properties.

Block copolymers can be used as compatibilizers. Block copolymers comprise sequences ("blocks") of the same monomer unit, covalently bound to sequences of unlike type. The blocks can be connected in a variety of ways, such as A-B in diblock and A-B-A triblock structures, where A represents one block and B represents a different block. In a multi-block copolymer, A and B can be connected in a number of different ways and be repeated multiply. The block copolymer may further comprise additional blocks of different type. Multi-block copolymers can be either linear multi-block, multi-block star polymers (in which all blocks bond to the same atom or chemical moiety) or comb-like polymers where the B blocks are attached at one end to an A backbone.

A block copolymer is created when two or more polymer molecules of different chemical composition are covalently bonded to each other. While a wide variety of block copolymer architectures are possible, a number of block copolymers involve the covalent bonding of hard plastic blocks, which are substantially crystalline or glassy, to elastomeric blocks forming thermoplastic elastomers. Other block copolymers, such as rubber-rubber (elastomer-elastomer), glass-glass, and glass-crystalline block copolymers, are also possible.

One method to make block copolymers is to produce a "living polymer". Unlike typical Ziegler-Natta polymerization processes, living polymerization processes involve only initiation and propagation steps and essentially lack chain terminating side reactions. This permits the synthesis of pre-determined and well-controlled structures desired in a block copolymer. A polymer created in a "living" system can have a narrow or extremely narrow distribution of molecular weight and be essentially monodisperse (i.e., the polydispersity index (PDI) is essentially one). Living catalyst systems are characterized by an initiation rate which is on the order of or exceeds the propagation rate, and the absence of termination or transfer reactions. In addition, these catalyst systems are characterized by the presence of a single type of active site. To produce a high yield of block copolymer in a polymerization process, such catalysts must exhibit living characteristics to a substantial extent.

Another method for producing block copolymers involves the use of chain shuttling technology. Such methods are exemplified in, for example, WO2005/090425, WO2005/090426, WO2005/090427 and WO2007/035489. In chain shuttling, block copolymers may be produced by shuttling a growing polymer chain between two or more catalysts in a given reactor environment whereby each catalyst makes a type of polymer that is distinct in composition. The catalysts can make polymers which differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The shuttling mechanism employs one or more shuttling agents, which do not make polymer, but serve to transfer the polymer between active catalyst sites. Alternatively, chain shuttling may be employed to produce a block copolymer by employing two or more reactors in series. In this case, the shuttling agent acts to extend the average life of a growing polymer chain such that the polymer chains experience chain growth in each reactor before termination. The composition of each of the polymer blocks is determined by the catalyst(s) and the reactor conditions.

SUMMARY OF THE INVENTION

The invention provides compositions comprising:
A) polypropylene;
B) polypropylene; and,
B) at least one crystalline block composite comprising:
  i) a crystalline ethylene based polymer;
  ii) a crystalline alpha-olefin based polymer and
  iii) a block copolymer comprising a crystalline ethylene block and a crystalline alpha-olefin block.

DESCRIPTION OF EMBODIMENTS OF THE INVENTION

Definitions

Figure 1:
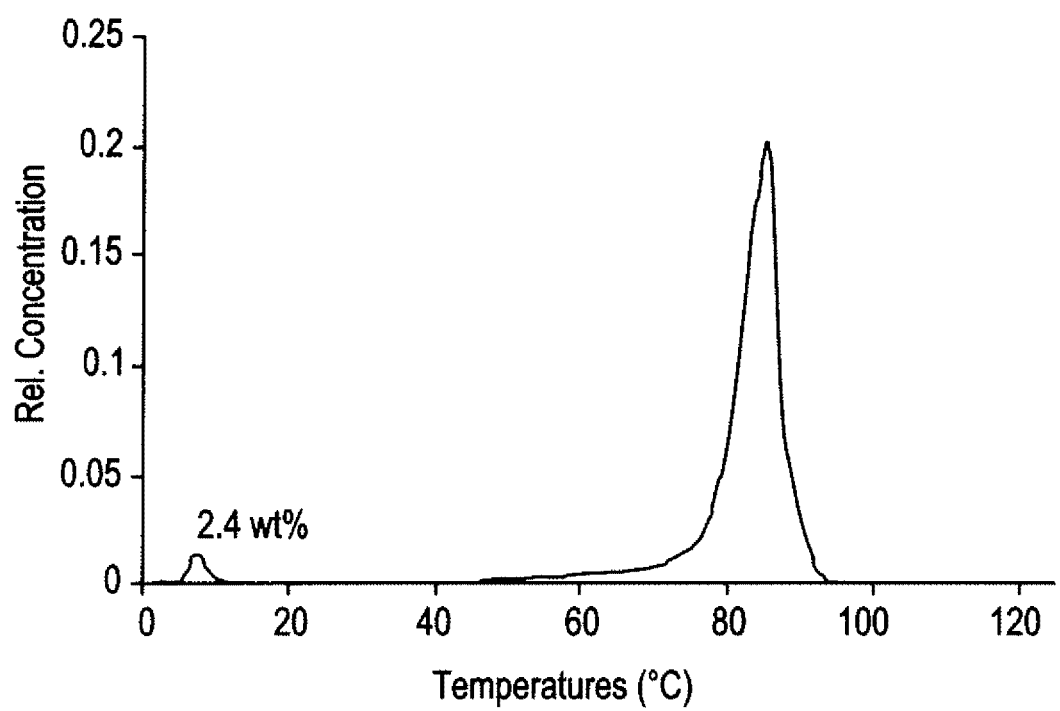
FIG. 1 shows FTREF analysis of CBC1.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "polymer" includes both conventional homopolymers, that is, homogeneous polymers prepared from a single monomer, and copolymers (interchangeably referred to herein as interpolymers), meaning polymers prepared by reaction of at least two monomers or otherwise containing chemically differentiated segments or blocks therein even if formed from a single monomer.

More specifically, the term "polyethylene" includes homopolymers of ethylene and copolymers of ethylene and one or more $C_{3-8}$ α-olefins in which ethylene comprises at least 50 mole percent.

The term "polypropylene" includes homopolymers of propylene such as isotactic polypropylene, syndiotactic polypropylene, and copolymers of propylene and one or more $C_{2, 4-8}$ α-olefins in which propylene comprises at least 50 mole percent. Preferably, a plurality of the polymerized monomer units of at least one block or segment in the polymer (a crystalline block) comprise propylene, preferably at least 90 mole percent, more preferably at least 93 mole percent, and most preferably at least 95 mole percent. A polymer made primarily from a different α-olefin, such as 4-methyl-1-pentene would be named similarly.

The term "crystalline" if employed, refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline ethylene polymers typically have, but are not limited to, densities of 0.89 g/cc to 0.97 g/cc and melting points of 75° C. to 140° C. Crystalline propylene polymers typically have, but are not limited to, densities of 0.88 g/cc to 0.91 g/cc and melting points of 100° C. to 170° C.

The term "amorphous" refers to a polymer lacking a crystalline melting point.

The term "isotactic" is defined as polymer repeat units having at least 70 percent isotactic pentads as determined by $^{13}$C-NMR analysis. "Highly isotactic" is defined as polymers having at least 90 percent isotactic pentads.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In a preferred embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the invention are characterized by unique distributions of both polymer polydispersity (PDI or Mw/Mn) and block length distribution, due, in a preferred embodiment, to the effect of a shuttling agent(s) in combination with the catalyst(s).

The term "crystalline block composite" (CBC) refers to the novel polymers of the invention comprising a crystalline ethylene based polymer (CEP), a crystalline alpha-olefin based polymer (CAOP), and a block copolymer having a crystalline ethylene block (CEB) and a crystalline alpha-olefin block (CAOB), wherein the CEB of the block copolymer is essentially the same composition as the CEP in the block composite and the CAOB of the block copolymer is essentially the same composition as the CAOP of the block composite. Additionally, the compositional split between the amount of CEP and CAOP will be essentially the same as that between the corresponding blocks in the block copolymer. The block copolymers can be linear or branched. More specifically, each of the respective block segments can contain long chain branches, but the block copolymer segment is substantially linear as opposed to containing grafted or branched blocks. When produced in a continuous process, the crystalline block composites desirably possess PDI from 1.7 to 15, preferably 1.8 to 10, preferably from 1.8 to 5, more preferably from 1.8 to 3.5.

CAOB refers to highly crystalline blocks of polymerized alpha olefin units in which the monomer is present in an amount greater than 90 mol %, preferably greater than 93 mol percent, more preferably greater than 95 mol percent, and preferably greater than 96 mol percent. In other words, the comonomer content in the CAOBs is less than 10 mol percent, and preferably less than 7 mol percent, and more preferably less than 5 mol percent, and most preferably less than 4 mol %. CAOBs with propylene crystallinity have corresponding melting points that are 80° C. and above, preferably 100° C. and above, more preferably 115° C. and above, and most preferably 120° C. and above. In some embodiments, the CAOB comprise all or substantially all propylene units. CEB, on the other hand, refers to blocks of polymerized ethylene units in which the comonomer content is 10 mol % or less, preferably between 0 mol % and 10 mol %, more preferably between 0 mol % and 7 mol % and most preferably between 0 mol % and 5 mol %. Such CEB have corresponding melting points that are preferably 75° C. and above, more preferably 90° C., and 100° C. and above.

Polymerization Methods

The crystalline block composite polymers of the invention are preferably prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions.

Suitable such processes useful in producing the crystalline block composites of the invention may be found, for example, in U.S. Patent Application Publication No. 2008/0269412, published on Oct. 30, 2008, which is herein incorporated by reference. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, as previously explained, the chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

Each reactor in the series can be operated under high pressure, solution, slurry, or gas phase polymerization conditions. In a multiple zone polymerization, all zones operate under the same type of polymerization, such as solution, slurry, or gas phase, but at different process conditions. For a solution polymerization process, it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion wherein normally either the metal complex or the cocatalyst is only poorly soluble is disclosed in U.S. Pat. No. 5,783,512. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa).

In all of the foregoing processes, continuous or substantially continuous polymerization conditions are preferably employed. The use of such polymerization conditions, especially continuous, solution polymerization processes, allows the use of elevated reactor temperatures which results in the economical production of the present crystalline block composites in high yields and efficiencies. Solution processes are particularly advantageous because the catalysts and chain shuttling agents are free to mix and react, allowing for more facile polymer chain transfer reactions than can occur in, e.g. slurry or gas-phase reactors.

The catalyst may be prepared as a homogeneous composition by addition of the requisite metal complex or multiple complexes to a solvent in which the polymerization will be conducted or in a diluent compatible with the ultimate reaction mixture. The desired cocatalyst or activator and, optionally, the shuttling agent may be combined with the catalyst composition either prior to, simultaneously with, or after combination of the catalyst with the monomers to be polymerized and any additional reaction diluent.

At all times, the individual ingredients as well as any active catalyst composition must be protected from oxygen, moisture and other catalyst poisons. Therefore, the catalyst components, shuttling agent and activated catalysts must be prepared and stored in an oxygen and moisture free atmosphere, preferably under a dry, inert gas such as nitrogen.

Without limiting in any way the scope of the invention, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization. Examples of suitable loop reactors and a variety of suitable operating conditions for use therewith, including the use of multiple loop reactors, operating in series, are found in U.S. Pat. Nos. 5,977,251, 6,319,989 and 6,683,149.

Catalyst along with cocatalyst and optionally chain shuttling agent are continuously or intermittently introduced in the reactor liquid phase or any recycled portion thereof at a minimum of one location. The reactor temperature and pressure may be controlled by adjusting the solvent/monomer ratio, the catalyst addition rate, as well as by use of cooling or heating coils, jackets or both. The polymerization rate is controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or by the previously mentioned chain shuttling agent, or a chain terminating agent such as hydrogen, as is well known in the art. Connected to the discharge of the reactor, optionally by means of a conduit or other transfer means, is a second reactor such that a large fraction of the polymer chains are dormant through attachment to the chain shuttling agent and have the potential to grow further in the second reactor. Between the first and second reactors, a differential in at least one process condition is established. Preferably for use in formation of a copolymer of two or more monomers, the difference is the presence or absence of one or more comonomers or a difference in comonomer concentration. Additional reactors, each arranged in a manner similar to the second reactor in the series may be provided as well. Upon exiting the last reactor of the series, the effluent is contacted with a catalyst kill agent such as water, steam or an alcohol or with a coupling agent.

When producing a block polymer having a crystalline ethylene block (CEB) and a crystalline alpha-olefin block (CAOB) in two reactors or zones it is possible to produce the CEB in the first reactor or zone and the CAOB in the second reactor or zone or to produce the CAOB in the first reactor or zone and the CEB in the second reactor or zone. It is more advantageous to produce CEB in the first reactor or zone with fresh chain shuttling agent added. The presence of increased levels of ethylene in the reactor or zone producing CEB will typically lead to much higher molecular weight in that reactor or zone than in the zone or reactor producing CAOB. The fresh chain shuttling agent will reduce the MW of polymer in the reactor or zone producing CEB thus leading to better overall balance between the length of the CEB and CAOB segments.

When operating reactors or zones in series it is necessary to maintain diverse reaction conditions such that one reactor produces CEB and the other reactor produces CAOB. Carry-over of ethylene from the first reactor to the second reactor (in series) or from the second reactor back to the first reactor through a solvent and monomer recycle system is preferably minimized. There are many possible unit operations to remove this ethylene, but because ethylene is more volatile than higher alpha olefins one simple way is to remove much of the unreacted ethylene through a flash step by reducing the pressure of the effluent of the reactor producing CEB and flashing off the ethylene. A more preferable approach is to avoid additional unit operations and to utilize the much greater reactivity of ethylene versus higher alpha olefins such that the conversion of ethylene across the CEB reactor approaches 100%. The overall conversion of monomers across the reactors can be controlled by maintaining the alpha olefin conversion at a high level (90 to 95%).

The resulting polymer product can be recovered by flashing off volatile components of the reaction mixture such as residual monomers or diluent at reduced pressure, and, if necessary, conducting further devolatilization in equipment such as a devolatilizing extruder. In a continuous process the mean residence time of the catalyst and polymer in the reactor generally is from 5 minutes to 8 hours, and preferably from 10 minutes to 6 hours.

Alternatively, the foregoing polymerization may be carried out in a plug flow reactor with a monomer, catalyst, shuttling agent, temperature or other gradient established between differing zones or regions thereof, optionally accompanied by separated addition of catalysts and/or chain shuttling agent, and operating under adiabatic or non-adiabatic polymerization conditions. Catalyst, monomers, or shuttling agent may be introduced solely at the start of the plug flow reactor or at various points along the length of the reactor.

The catalyst composition may also be prepared and employed as a heterogeneous catalyst by adsorbing the requisite components on an inert inorganic or organic particulated solid, as previously disclosed. In a preferred embodiment, a heterogeneous catalyst is prepared by co-precipitating the metal complex and the reaction product of an inert inorganic compound and an active hydrogen containing activator, especially the reaction product of a tri($C_{1-4}$ alkyl)aluminum compound and an ammonium salt of a hydroxyaryltris(pentafluorophenyl)borate, such as an ammonium salt of (4-hydroxy-3,5-ditertiarybutylphenyl)tris(pentafluorophenyl)borate. When prepared in heterogeneous or supported form, the catalyst composition may be employed in a slurry or a gas phase polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. As with a solution polymerization, the α-olefin comonomer or a mixture of different α-olefin monomers may be used in whole or part as the diluent. Most preferably at least a major part of the diluent comprises the α-olefin monomer or monomers to be polymerized.

In a preferred embodiment, the crystalline block composites of the invention comprise a fraction of block polymer which possesses a most probable distribution of block lengths. Preferred block polymers according to the invention are block copolymers containing 2 or 3 blocks or segments. In a polymer containing three or more segments (that is blocks separated by a distinguishable block) each block may be the same or chemically different and generally characterized by a distribution of properties. In a process for making the polymers, chain shuttling is used as a way to prolong the lifetime of a polymer chain such that a substantial fraction of the polymer chains exit at least the first reactor of a multiple reactor series or the first reactor zone in a multiple zoned reactor operating substantially under plug flow conditions in the form of polymer terminated with a chain shuttling agent. On transfer of a polymer chain from the chain shuttling agent back to a catalyst in a subsequent reactor or zone, polymer chain growth occurs under different polymerization conditions. Different polymerization conditions in the respective reactors or zones include the use of different monomers, comonomers, or monomer/comonomer(s) ratio, different polymerization temperatures, pressures or partial pressures of various monomers, different catalysts, differing monomer gradients, or any other difference leading to formation of a distinguishable polymer segment. Thus, at least a portion of the polymer comprises two, three, or more, preferably two or three, differentiated polymer segments arranged in a linear sequence.

The following mathematical treatment of the resulting polymers is based on theoretically derived parameters that are believed to apply and demonstrate that, especially in two or more steady-state, continuous reactors or zones connected in series, having differing polymerization conditions to which the growing polymer is exposed, the block lengths of the polymer being formed in each reactor or zone will conform to a most probable distribution, derived in the following manner, wherein pi is the probability of polymer propagation in a reactor with respect to block sequences from catalyst i. The theoretical treatment is based on standard assumptions and methods known in the art and used in predicting the effects of polymerization kinetics on molecular architecture, including the use of mass action reaction rate expressions that are not affected by chain or block lengths, and the assumption that polymer chain growth is completed in a very short time compared to the mean reactor residence time. Such methods have been previously disclosed in W. H. Ray, J. Macromol. Sci., Rev. Macromol. Chem., C8, 1 (1972) and A. E. Hamielec and J. F. MacGregor, "Polymer Reaction Engineering", K. H.

Reichert and W. Geisler, Eds., Hanser, Munich, 1983. In addition, it is assumed that each incidence of the chain shuttling reaction in a given reactor results in the formation of a single polymer block, whereas transfer of the chain shuttling agent terminated polymer to a different reactor or zone and exposure to different polymerization conditions results in formation of a different block. For catalyst i, the fraction of sequences of length n being produced in a reactor is given by Xi[n], where n is an integer from 1 to infinity representing the total number of monomer units in the block.

$$Xi[n] = (1 - pi)pi(n - 1) \quad \text{most probable distribution of block lengths}$$

$$Ni = \frac{1}{1 - pi} \qquad \text{number average block length}$$

If more than one catalyst is present in a reactor or zone, each catalyst has a probability of propagation (pi) and therefore has a unique average block length and distribution for polymer being made in that reactor or zone. In a most preferred embodiment the probability of propagation is defined as:

$$pi = \frac{Rp[i]}{Rp[i] + Rt[i] + Rs[i] + [Ci]}$$

for each catalyst i={1,2 . . . }, where,
Rp[i]=Local rate of monomer consumption by catalyst i, (moles/L/time),
Rt[i]=Total rate of chain transfer and termination for catalyst i, (moles/L/time), and
Rs[i]=Local rate of chain shuttling with dormant polymer, (moles/L/time).

For a given reactor the polymer propagation rate, Rp[i], is defined using an apparent rate constant, $\overline{kpi}$, multiplied by a total monomer concentration, [M], and multiplied by the local concentration of catalyst i, [Ci],as follows:

$$Rp[i] = \overline{kpi}[M][Ci]$$

The chain transfer, termination, and shuttling rate is determined as a function of chain transfer to hydrogen (H2), beta hydride elimination, and chain transfer to chain shuttling agent (CSA). The quantities [H2] and [CSA] are molar concentrations and each subscripted k value is a rate constant for the reactor or zone:

$$Rt[i] = kH2i[H2][Ci] + k\beta i[Ci] + kai[CSA][Ci]$$

Dormant polymer chains are created when a polymer moiety transfers to a CSA and all CSA moieties that react are assumed to each be paired with a dormant polymer chain. The rate of chain shuttling of dormant polymer with catalyst i is given as follows, where [CSAf] is the feed concentration of CSA, and the quantity ([CSAf]−[CSA]) represents the concentration of dormant polymer chains:

$$Rs[i] = kai[Ci]([CSAf] - [CSA])$$

As a result of the foregoing theoretical treatment, it may be seen that the overall block length distribution for each block of the resulting block copolymer is a sum of the block length distribution given previously by Xi[n], weighted by the local polymer production rate for catalyst i. This means that a polymer made under at least two different polymer forming conditions will have at least two distinguishable blocks or segments each possessing a most probable block length distribution.

Monomers

Suitable monomers for use in preparing the crystalline block composites of the present invention include ethylene, propylene, or any other olefin which produces a crystalline polymer, and any addition polymerizable comonomer. The polymerizable comonomers are preferably any olefin or diolefin comonomer, more preferably any α-olefin comonomer. Examples of suitable comonomers include straight-chain or branched α-olefins of 2 to 30, preferably 2 to 20 carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20 carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene; aromatic vinyl compounds such as mono- or poly-alkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene and a-methylstyrene, vinylchloride, 1,2-difluoroethylene, 1,2-dichloroethylene, tetrafluoroethylene, and 3,3,3-trifluoro-1-propene, provided the monomer is polymerizable under the conditions employed.

Preferred monomers or mixtures of monomers for use in combination with at least one CSA herein include ethylene; propylene; mixtures of ethylene with one or more monomers selected from the group consisting of propylene, 1-butene, 1-hexene, 4-methyl-1-pentene, 1-octene, and styrene; and mixtures of ethylene, propylene and a conjugated or non-conjugated diene.

Catalysts and Chain Shuttling Agents

Suitable catalysts and catalyst precursors for use in the present invention include metal complexes such as disclosed in WO2005/090426, in particular, those disclosed starting on page 20, line 30 through page 53, line 20, which is herein incorporated by reference. Suitable catalysts are also disclosed in U.S. 2006/0199930; U.S. 2007/0167578; U.S. 2008/0311812; U.S. Pat. No. 7,355,089 B2; or WO 2009/012215, which are herein incorporated by reference with respect to catalysts.

Particularly preferred catalysts are those of the following formula:

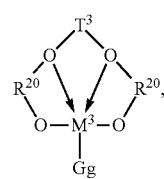

where:

$R^{20}$ is an aromatic or inertly substituted aromatic group containing from 5 to 20 atoms not counting hydrogen, or a polyvalent derivative thereof;

$T^3$ is a hydrocarbylene or silane group having from 1 to 20 atoms not counting hydrogen, or an inertly substituted derivative thereof;

$M^3$ is a Group 4 metal, preferably zirconium or hafnium;

G is an anionic, neutral or dianionic ligand group; preferably a halide, hydrocarbyl or dihydrocarbylamide group having up to 20 atoms not counting hydrogen;

g is a number from 1 to 5 indicating the number of such G groups; and bonds and electron donative interactions are represented by lines and arrows respectively.

Preferably, such complexes correspond to the formula:

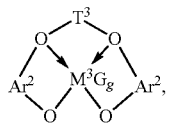

wherein: $T^3$ is a divalent bridging group of from 2 to 20 atoms not counting hydrogen, preferably a substituted or unsubstituted, $C_{3-6}$ alkylene group; and $Ar^2$ independently each occurrence is an arylene or an alkyl- or aryl-substituted arylene group of from 6 to 20 atoms not counting hydrogen;

$M^3$ is a Group 4 metal, preferably hafnium or zirconium;

G independently each occurrence is an anionic, neutral or dianionic ligand group;

g is a number from 1 to 5 indicating the number of such X groups; and electron donative interactions are represented by arrows.

Preferred examples of metal complexes of foregoing formula include the following compounds :

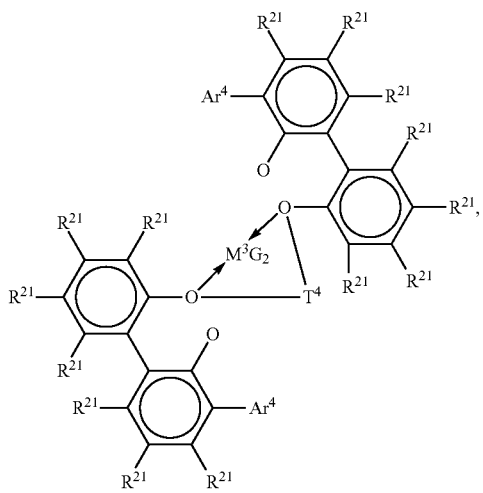

where $M^3$ is Hf or Zr;

$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently each occurrence comprises a $C_{3-6}$ alkylene group, a $C_{3-6}$ cycloalkylene group, or an inertly substituted derivative thereof;

$R^{21}$ independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

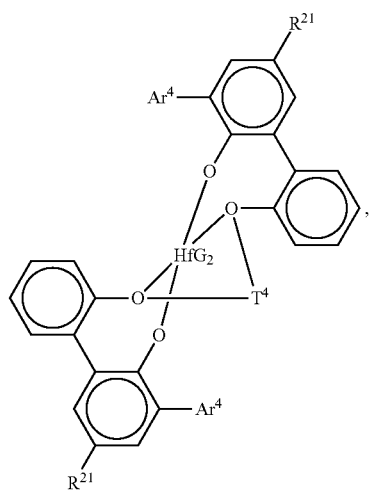

wherein $Ar^4$ is 3,5-di(isopropyl)phenyl, 3,5-di(isobutyl)phenyl, dibenzo-1H-pyrrole-1-yl, or anthracen-5-yl, $R^{21}$ is hydrogen, halo, or $C_{1-4}$ alkyl, especially methyl $T^4$ is propan-1,3-diyl or butan-1,4-diyl, and G is chloro, methyl or benzyl.

Other suitable metal complexes are those of the formula:

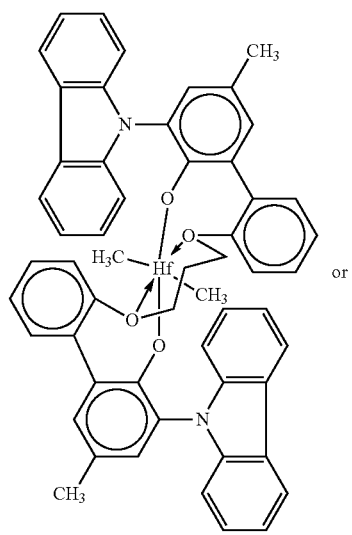

or

-continued

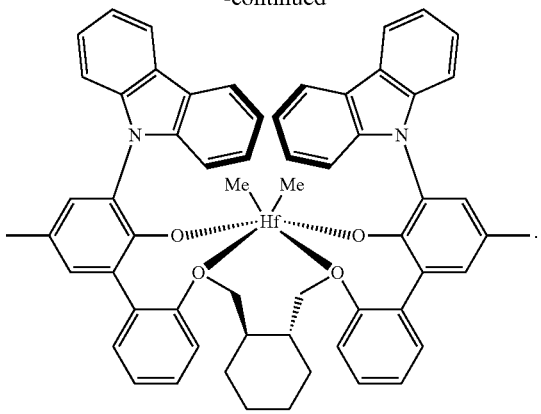

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, WO 02/38628, WO 03/40195, and U.S. Ser. No. 04/0,220, 050.

Suitable co-catalysts are those disclosed in WO2005/090426, in particular, those disclosed on page 54, line 1 to page 60, line 12, which is herein incorporated by reference.

Suitable chain shuttling agents are those disclosed in WO2005/090426, in particular, those disclosed on page 19, line 21 through page 20 line 12, which is herein incorporated by reference. Particularly preferred chain shuttling agents are dialkyl zinc compounds.

Preferably, the block composite polymers of the invention comprise ethylene, propylene, 1-butene or 4-methyl-1-pentene and optionally one or more comonomers in polymerized form. Preferably, the block copolymers of the crystalline block composites comprise in polymerized form ethylene, propylene, 1-butene, or 4-methyl-1-pentene and optionally one or more $C_{4-20}$ α-olefin comonomers, Additional suitable comonomers are selected from diolefins, cyclic olefins, and cyclic diolefins, halogenated vinyl compounds, and vinylidene aromatic compounds.

Comonomer content in the resulting block composite polymers may be measured using any suitable technique, with techniques based on nuclear magnetic resonance (NMR) spectroscopy preferred.

Preferably the crystalline block composite polymers of the invention comprise from 0.5 to 95 wt % CEP, from 0.5 to 95 wt % CAOP and from 5 to 99 wt % block copolymer. More preferably, the crystalline block composite polymers comprise from 0.5 to 79 wt % CEP, from 0.5 to 79 wt % CAOP and from 20 to 99 wt % block copolymer and more preferably from 0.5 to 49 wt % CEP, from 0.5 to 49 wt % CAOP and from 50 to 99 wt % block copolymer. Weight percents are based on total weight of crystalline block composite. The sum of the weight percents of CEP, CAOP and block copolymer equals 100%.

Preferably, the block copolymers of the invention comprise from 5 to 95 weight percent crystalline ethylene blocks (CEB) and 95 to 5 wt percent crystalline alpha-olefin blocks (CAOB). They may comprise 10 wt % to 90 wt % CEB and 90 wt % to 10 wt % CAOB. More preferably, the block copolymers comprise 25 to 75 wt % CEB and 75 to 25 wt % CAOB, and even more preferably they comprise 30 to 70 wt % CEB and 70 to 30 wt % CAOB.

The crystalline block composite polymers of the invention may be differentiated from conventional, random copolymers, physical blends of polymers, and block copolymers prepared via sequential monomer addition. The crystalline block composites may be differentiated from random copolymers and from a physical blend by characteristics such as crystalline block composite index, better tensile strength, improved fracture strength, finer morphology, improved optics, and greater impact strength at lower temperature; from block copolymers prepared by sequential monomer addition by molecular weight distribution, rheology, shear thinning, rheology ratio, and in that there is block polydispersity. Block segment polydispersity has been shown to be beneficial for forming fine dispersions of immiscible polymers. (R. B. Thompson and M. W. Matsen, Phys. Rev. Let., 2000, 85(3), 670.) A unique feature of crystalline block composites is that they cannot be fractionated by conventional means by solvent or temperature such as xylene fractionation, solvent/non-solvent, or temperature rising elution fractionation or crystallization elution fractionation since the individual blocks of the block copolymer are crystalline.

In some embodiments, the block composites of the invention have a Crystalline Block Composite Index (CBCI), as defined below, that is greater than zero but less than about 0.4 or from about 0.1 to about 0.3. In other embodiments, CBCI is greater than about 0.4 and up to about 1.0. In some embodiments, the CBCI is in the range of from about 0.1 to about 0.9, from about 0.1 to about 0.8, from about 0.1 to about 0.7 or from about 0.1 to about 0.6. Additionally, the CBCI can be in the range of from about 0.4 to about 0.7, from about 0.5 to about 0.7, or from about 0.6 to about 0.9. In some embodiments, CBCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, CBCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Further preferably, the crystalline block composites of this embodiment of the invention have a weight average molecular weight (Mw) of 1,000 to about 2,500,000, preferably of 35000 to about 1,000,000 and more preferably of 50,000 to 500,000, of 50,000 to about 300,000, and preferably from 50,000 to about 200,000.

The polymers of the invention may be oil extended with from 5 weight percent to about 95 weight percent, preferably from 10 weight percent to 60 weight percent, more preferably from 20 weight percent to 50 weight percent, based on total composition weight, of a processing oil. Suitable oils include any oil that is conventionally used in manufacturing extended EPDM rubber formulations. Examples include both refined naphthenic and paraffinic oils, and polymerized synthetic low molecular weight, amorphous polyalphaolefins, with paraffinic oils being preferred.

The polymers of the invention may be cross-linked with any suitable cross-linking agent. Suitable cross-linking agents include, but are not limited to, phenolic resin, peroxides, azides, aldehyde-amine reaction products, vinyl silane grafted moieties, hydrosilylation, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. Suitable cross-linking agents may also be used such as those disclosed in U.S. Pat. No. 7,579,408, col. 31, line 54 through col. 34, line 52, which disclosure is herein incorporated by reference.

Crosslinking may also be accomplished by the application of radiation such as with electron beam radiation.

A composition according to the invention may include carbon black. Preferably, the carbon black is present in the amount of from 10 to 80 percent, more preferably from 20 to 60 percent, based on total composition weight.

Additional components of the present formulations usefully employed according to the present invention include various other ingredients in amounts that do not detract from the properties of the resultant composition. These ingredients include, but are not limited to, activators such as calcium or magnesium oxide; fatty acids such as stearic acid and salts thereof; fillers and reinforcers such as calcium or magnesium carbonate, silica, and aluminum silicates; plasticizers such as dialkyl esters of dicarboxylic acids; antidegradants; softeners; waxes; and pigments.

Polyethylene/Polypropylene/CBC Compositions

Some embodiments of the present invention comprise compositions comprising from 98 to 0.5 wt % crystalline block composite with the remainder being polyethylene, polyalpha-olefin, and combinations thereof. Preferably, the compositions comprise 50 to 0.5 wt % CBC and more preferably 15 to 0.5 wt % CBC.

Any High Density Polyethylene (HDPE) or Linear Low Density Polyethylene (LLDPE) may be used as the polyethylene component such as those produced via gas-phase, solution, or slurry process with either a chromium catalyst (broad MWD), Ziegler Natta catalyst (med MWD), or metallocene or post-metallocene catalyst (narrow MWD). Furthermore, any LDPE homopolymer or copolymer produced via high pressure free radical polymerization in either an autoclave or tubular reactor maybe used. The polyethylene used in the present invention may be HDPE or LLDPE with densities of from 0.90 to 0.98 g/cm$^3$. Further, the polyethylene may be a Low Density Polyethylene (LDPE) homopolymer having a density range from 0.91 to 0.94 g/cm$^3$ or may be copolymerized with suitable comonomers such as vinyl acetate, $\alpha,\beta$-ethylenically unsaturated mono- or dicarboxylic acids, and combinations thereof, glycidyl methacrylate, ethyl acrylate, or butyl acrylate. The copolymers of LDPE containing $\alpha,\beta$-ethylenically unsaturated mono- or dicarboxylic acids may be neutralized in a post polymerization process with metal ions and compounds of alkali metals, alkaline earth metals, and transition metals; and combinations thereof. Particular cation sources include, but are not limited to, metal ions and compounds of lithium, sodium, potassium, magnesium, cesium, calcium, barium, manganese, copper, zinc, tin, rare earth metals, and combinations thereof.

The crystalline polyalphaolefin may be any such polymer such as polypropylene, polybutylene, poly(4-methylpentene), etc. A polypropylene polymer used in the present invention may be any polypropylene polymer made via any means known to one of skill in the art or polypropylene polymer blend, such as a homopolymer polypropylene, a random ethylene or butene copolymer of polypropylene, or an impact modified polypropylene blend which contains either a homopolymer polypropylene or a crystalline random copolymer of ethylene and propylene combined with a rubbery ethylene-propylene copolymer.

The compositions of the invention provide improved properties as compared to compositions of component A) and B) and lacking C). In particular, the room temperature Izod Impact Strength, measured as described below, is at least 5% greater, preferably at least 10% greater, more preferably at least 20% greater and most preferably at least 25% greater than that of the composition of A) and B) but lacking C). In addition, for the compositions exhibiting this improved Izod Impact Strength, the average modulus, measured as described below, is no lower than 35%, preferably no lower than 25%, more preferably no lower than 20% and most preferably no lower than 10% of the value for the composition with components A) and B) but lacking C).

The inventive compositions may be used in a number of applications, including but not limited to injection molded and compression molded articles such as automotive parts, toys, containers, other parts and other goods.

Testing Methods

The overall composition of each resin is determined by DSC, NMR, GPC, DMS, and TEM morphology. HTLC is further used to estimate the Crystalline Block Composite Index of the polymer as explained below.

Test specimens for physical property testing were produced via injection molding. The specimens were further tested for flex modulus, tensile, Izod impact, and optical properties.

Density

Samples for density measurement are prepared according to ASTM D1928. Measurements are made within one hour of sample pressing using ASTM D792, Method B.

Melt Flow Rate

Melt flow rate or I2 of the samples were measured using ASTM D 1238, Condition 230° C., 2.16 kg. Melt flow rate or I10 of the samples are measured using ASTM D1238, Condition 230° C., 10 kg.

Tensile Testing

Stress-strain behavior in uniaxial tension is measured using ASTM D638. Injection molded tensile specimens are used (approx. 16.5 mm 19 mm×3 mm). Samples are stretched with an Instron at 50 mm/min at 23 C. Tensile strengths and elongation at break are reported for an average of 5 specimens.

Flex Modulus

Flexular and 1 percent secant moduli are measured according to ASTM D-790. Samples are prepared by injection molding of tensile bars (approx. 16.5 mm×19 mm×3 mm) and conditioned for at least 40 hours at room temperature.

Optical Properties

Plaques of 1 mm thickness are compression molded. Clarity, transmittance, and haze is measured using BYK Gardner Haze-gard as specificied in ASTM D1746. 60° gloss is measured using BYK Gardner Glossmeter Microgloss 60° as specified in ASTM D-2457.

Izod Impact

The notched Izod impact tests were done on injection molded specimens (63.5 mm×12.7 mm×3 mm) was used with a milled notch and confirmed according to ASTM D256. The samples were notched using a notcher to produce a notch depth 2.54+/−0.05 mm. Five specimens of each sample were tested using ASTM D256 at room temperature, 23° C., and 0° C.

Injection Molding

The test specimens for Flex modulus, IZOD testing, Tensile, and Optical properties are injection molded on an Arborg 370C, 80 tonne injection molder. The polymer was injected at 400° F. (204° C.) into a 100° F. (37° C.) water jacketed mold. The cycle time is approximately 50 seconds. ASTM specification molds were used in the preparation of the specimens.

Compression Molding Conditions

Polymer films and specimens (unless otherwise specified) are prepared by compression molding followed by fast quenching using a Carver Press (such as Model #4095-4PR1001R). The polymer is pre-melted at 190° C. for 1 minute at 1000 psi and then pressed for 2 minutes at 5000 psi and then quenched between chilled platens (15-20° C.) for 2 minutes.

High Temperature Liquid Chromatography (HTLC)

HTLC is performed according to the methods disclosed in U.S. Patent Application Publication No. 2010-0093964 and U.S. patent application Ser. No. 12/643,111, filed Dec. 21, 2009, both of which are herein incorporated by reference. Samples are analyzed by the methodology described below.

A Waters GPCV2000 high temperature SEC chromatograph was reconfigured to build the HT-2DLC instrumentation. Two Shimadzu LC-20AD pumps were connected to the injector valve in GPCV2000 through a binary mixer. The first dimension (D1) HPLC column was connected between the injector and a 10-port switch valve (Valco Inc). The second dimension (D2) SEC column was connected between the 10-port valve and LS (Varian Inc.), IR (concentration and composition), RI (refractive index), and IV (intrinsic viscosity) detectors. RI and IV were built-in detector in GPCV2000. The IR5 detector was provided by PolymerChar, Valencia, Spain.

Columns: The D1 column was a high temperature Hypercarb graphite column (2.1×100 mm) purchased from Thermo Scientific. The D2 column was a PLRapid-H column purchased from Varian (10×100 mm).

Reagents: HPLC grade trichlorobenzene (TCB) was purchased from Fisher Scientific. 1-Decanol and decane were from Aldrich. 2,6-Di-tert-butyl-4-methylphenol (Ionol) was also purchased from Aldrich.

Sample Preparation: 0.01-0.15 g of polyolefin sample was placed in a 10-mL Waters autosampler vial. 7-mL of either 1-decanol or decane with 200 ppm Ionol was added to the vial afterwards. After sparging helium to the sample vial for about 1 min, the sample vial was put on a heated shaker with temperature set at 160° C. The dissolution was done by shaking the vial at the temperature for 2 hr. The vial was then transferred to the autosampler for injection. Please note that the actual volume of the solution was more than 7 mL due to the thermal expansion of the solvent.

HT-2DLC: The D1 flow rate was at 0.01 mL/min. The composition of the mobile phase was 100% of the weak eluent (1-decanol or decane) for the first 10 min of the run. The composition was then increased to 60% of strong eluent (TCB) in 489 min. The data were collected for 489 min as the duration of the raw chromatogram. The 10-port valve switched every three minutes yielding 489/3=163 SEC chromatograms. A post-run gradient was used after the 489 min data acquisition time to clean and equilibrate the column for the next run:

Clean step:
1. 490 min: flow=0.01 min;//Maintain the constant flow rate of 0.01 mL/min from 0-490 min.
2. 491 min: flow=0.20 min;//Increase the flow rate to 0.20 mL/min.
3. 492 min: % B=100;//Increase the mobile phase composition to 100% TCB
4. 502 min: % B=100;//Wash the column using 2 mL of TCB Equilibrium step:
5. 503 min: % B=0;//Change the mobile phase composition to 100% of 1-decanol or decane
6. 513 min: % B=0;//Equilibrate the column using 2 mL of weak eluent
7. 514 min: flow=0.2 mL/min;//Maintain the constant flow of 0.2 mL/min from 491-514 min
8. 515 min: flow=0.01 mL/min;//Lower the flow rate to 0.01 mL/min.

After step 8, the flow rate and mobile phase composition were the same as the initial conditions of the run gradient.

The D2 flow rate was at 2.51 mL/min. Two 60 µL loops were installed on the 10-port switch valve. 30-µL of the eluent from D1 column was loaded onto the SEC column with every switch of the valve. The IR, LS15 (light scattering signal at 15°), LS90 (light scattering signal at 90°), and IV (intrinsic viscosity) signals were collected by EZChrom through a SS420X analogue-to-digital conversion box. The chromatograms were exported in ASCII format and imported into a home-written MATLAB software for data reduction. Using an appropriate calibration curve of polymer composition and retention volume, of polymers that are of similar nature of the CAOB and CEB polymers being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard.

Differential Scanning Calorimetry (DSC)

Differential Scanning calorimetry is performed on a TA Instruments Q1000 DSC equipped with an RCS cooling accessory and an auto sampler. A nitrogen purge gas flow of 50 ml/min is used. The sample is pressed into a thin film and melted in the press at about 230° C. and then air-cooled to room temperature (25° C.). About 3-10 mg of material is then cut, accurately weighed, and placed in a light aluminum pan (ca 50 mg) which is later crimped shut. The thermal behavior of the sample is investigated with the following temperature profile: the sample is rapidly heated to 230° C. and held isothermal for 3 minutes in order to remove any previous thermal history. The sample is then cooled to −90° C. at 10° C./min cooling rate and held at −90° C. for 3 minutes. The sample is then heated to 230° C. at 10° C./min heating rate. The cooling and second heating curves are recorded.

$^{13}$C Nuclear Magnetic Resonance (NMR)

Sample Preparation

The samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters

The data is collected using a Bruker 400 MHz spectrometer equipped with a Bruker Dual DUL high-temperature Cryo-Probe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition.

Gel Permeation Chromatography (GPC)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polypropylene} = 0.645 (M_{polystyrene})$.

Polypropylene equivalent molecular weight calculations are performed using Viscotek TriSEC software Version 3.0.

Fast-Temperature Rising Elution Fractionation (F-TREF)

In F-TREF analysis, the composition to be analyzed is dissolved in ortho-dichlorobenzene and allowed to crystallize in a column containing an inert support (stainless steel shot) by slowly reducing the temperature to 30° C. (at a preferred rate of 0.4° C./min). The column is equipped with an infra-red detector. An F-TREF chromatogram curve is then generated by eluting the crystallized polymer sample from the column by slowly increasing the temperature of the eluting solvent (o-dichlorobenzene) from 30 to 140° C. (at a preferred rate of 1.5° C./min).

Dynamic Mechanical Spectroscopy (DMS)

The dynamic mechanical measurements (loss and storage modulus vs. temperature) are measured on TA instruments ARES. The dynamic modulus measurements are performed in torsion on a solid bar of ca. 2 mm thickness, 5 mm wide and ca. 10 mm in length. The data is recorded at a constant frequency of 10 rad/s and at a heating/cooling rate of 5° C./min. The temperature sweeps are performed from −50 to 190 C at 5° C./min.

Transmission Electron Microscopy (TEM)

Polymer films are prepared by compression molding followed by fast quenching.

The polymer is pre-melted at 190° C. for 1 minute at 1000 psi and then pressed for 2 minutes at 5000 psi and then quenched between chilled platens (15-20° C.) for 2 minutes.

The compression molded films or samples are trimmed so that sections could be collected near the core of the sample. The trimmed samples are cryopolished prior to staining by removing sections from the blocks at −60° C. to prevent smearing of the elastomer phases. The cryo-polished blocks are stained with the vapor phase of a 2% aqueous ruthenium tetraoxide solution for 3 hrs at ambient temperature. The staining solution is prepared by weighing 0.2 gm of ruthenium (III) chloride hydrate ($RuCl_3 \times H_2O$) into a glass bottle with a screw lid and adding 10 ml of 5.25% aqueous sodium hypochlorite to the jar. The samples are placed in the glass jar using a glass slide having double sided tape. The slide is placed in the bottle in order to suspend the blocks about 1 inch above the staining solution. Sections of approximately 90 nanometers in thickness are collected at ambient temperature using a diamond knife on a Leica EM UC6 microtome and placed on 600 mesh virgin TEM grids for observation.

Image Collection—TEM images are collected on a JEOL JEM-1230 operated at 100 kV accelerating voltage and collected on a Gatan-791 and 794 digital cameras.

Estimating the Crystalline Block Composite Index (CBCI)

Because the compositions of these block copolymers have a CAOP and CAOB composed of crystalline polypropylene and a CEP and CEB composed of crystalline polyethylene, they cannot be fractionated by conventional means. Techniques based on solvent or temperature fractionation, for example, using xylene fractionation, solvent/non-solvent separation, temperature rising elution fractionation, or crystallization elution fractionation are not capable of resolving the block copolymer since the CEB and CAOB cocrystallize with the CEP and CAOP, respectively. However, using a method such as high temperature liquid chromatography which separates polymer chains using a combination of a mixed solvent/non-solvent and a graphitic column, crystalline polymer species such as polypropylene and polyethylene can be separated from each other and from the block copolymer.

For example, the Crystalline Block Composite examples described below show a polypropylene fraction and a polyethylene fraction when separated by high temperature liquid chromatography (refer to FIG. 1). The analysis shows that the amount of isolated PP is less than if the polymer was a simple blend of iPP homopolymer (in this example the CAOP) and polyethylene (in this example the CEP). Consequently, the polyethylene fraction contains an appreciable amount of propylene that would not otherwise be present if the polymer was simply a blend of iPP and polyethylene. To account for this "extra propylene", a mass balance calculation can be performed to estimate a crystalline block composite index from the amount of the polypropylene and polyethylene fractions and the weight % propylene present in each of the fractions that are separated by HTLC. The polymers contained within the crystalline block composite include iPP-PE diblock, unbound iPP, and unbound PE where the individual PP or PE components can contain a minor amount of ethylene or propylene, respectively.

Composition of the Crystalline Block Composite

A summation of the weight % propylene from each component in the polymer according to equation 1 results in the overall weight % propylene (of the whole polymer). This mass balance equation can be used to quantify the amount of the iPP and PE present in the diblock copolymer. This mass balance equation can also be used to quantify the amount of iPP and PE in a binary blend or extended to a ternary, or n-component blend. For the CBCs, the overall amount of iPP or PE is contained within the blocks present in the diblock and the unbound iPP and PE polymers.

$$\text{Wt \% } C3_{Overall} = w_{PP}(\text{wt \% } C3_{PP}) + w_{PE}(\text{wt \% } C3_{PE}) \qquad \text{Eq. 1}$$

where $w_{PP}$=weight fraction of PP in the polymer $w_{PE}$=weight fraction of PE in the polymer wt % $C3_{PP}$=weight percent of propylene in PP component or block wt % $C3_{PE}$=weight percent of propylene in PE component or block Note that the overall weight % of propylene (C3) is preferably measured from C13 NMR or some other composition measurement that represents the total amount of C3 present in the whole polymer. The weight % propylene in the iPP block (wt % C3pp) is set to 100 or if otherwise known from its DSC melting point, NMR measurement, or other composition estimate, that value can be put into its place. Similarly, the weight % propylene in the PE block (wt % $C3p_E$) is set to 100 or if otherwise known from its DSC melting point, NMR measurement, or other composition estimate, that value can be put into its place.

Calculating the Ratio of PP to PE in the Crystalline Block Composite

Based on equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the diblock copolymer. For a conventional blend, the weight fraction of PP and weight fraction of PE corresponds to the individual amount of PP and PE polymer present. For the crystalline block composite, it is assumed that the ratio of the weight fraction of PP to PE also corresponds to the average block ratio between PP and PE present in this statistical block copolymer.

$$w_{PP} = \frac{\text{wt \%} \ C3_{Overall} - \text{wt \%} \ C3_{PE}}{\text{wt \%} \ C3_{PP} - \text{wt \%} \ C3_{PE}} \quad \text{Eq. 2}$$

where $w_{PP}$=weight fraction of PP present in the whole polymer wt % $C3_{PP}$=weight percent of propylene in PP component or block wt % $C3_{PE}$=weight percent of propylene in PE component or block Estimating the Amount of the Diblock in the Crystalline Block Composite Applying equations 3 through 5, the amount of the isolated PP that is measured by HTLC analysis is used to determine the amount of polypropylene present in the diblock copolymer. The amount isolated or separated first in the HTLC analysis represents the 'unbound PP' and its composition is representative of the PP hard block present in the diblock copolymer. By substituting the overall weight % C3 of the whole polymer in the left hand side of equation 3, and the weight fraction of PP (isolated from HTLC) and the weight fraction of PE (separated by HTLC) into the right hand side of equation 3, the weight % of C3 in the PE fraction can be calculated using equations 4 and 5. The PE fraction is described as the fraction separated from the unbound PP and contains the diblock and unbound PE. The composition of the isolated PP is assumed to be the same as the weight % propylene in the iPP block as described previously.

$$\text{wt \%} \ C3_{Overall} = \quad \text{Eq. 3}$$
$$w_{PPisolated}(\text{wt \%} \ C3_{PP}) + w_{PE-fraction}(\text{wt \%} \ C3_{PE-fraction})$$

$$\text{wt \%} \ C3_{PE-fraction} = \frac{\text{wt \%} \ C3_{Overall} - w_{PPisolated}(\text{wt \%} \ C3_{PP})}{w_{PE-fraction}} \quad \text{Eq. 4}$$

$$w_{PE-fraction} = 1 - w_{PPisolated} \quad \text{Eq. 5}$$

where $w_{PPisolated}$=weight fraction of isolated PP from HTLC $w_{PE-fraction}$=weight fraction of PE separated from HTLC, containing the diblock and unbound PE wt % $C3_{PP}$=weight % of propylene in the PP; which is also the same amount of propylene present in the PP block and in the unbound PP wt % $C3_{PE-fraction}$=weight % of propylene in the PE-fraction that was separated by HTLC wt % $C3_{overall}$=overall weight % propylene in the whole polymer The amount of wt % C3 in the polyethylene fraction from HTLC represents the amount of propylene present in the block copolymer fraction that is above the amount present in the 'unbound polyethylene'.

To account for the 'additional' propylene present in the polyethylene fraction, the only way to have PP present in this fraction is for the PP polymer chain to be connected to a PE polymer chain (or else it would have been isolated with the PP fraction separated by HTLC). Thus, the PP block remains adsorbed with the PE block until the PE fraction is separated. The amount of PP present in the diblock is calculated using Equation 6.

$$w_{PP-diblock} = \frac{\text{wt \%} \ C3_{PE-fraction} - \text{wt \%} \ C3_{PE}}{\text{wt \%} \ C3_{PP} - \text{wt \%} \ C3_{PE}} \quad \text{Eq. 6}$$

Where wt % $C3_{PE-fraction}$=weight % of propylene in the PE-fraction that was separated by HTLC (Equation 4)

wt % $C3_{PP}$=weight % of propylene in the PP component or block (defined previously)

wt % $C3_{PE}$=weight % of propylene in the PE component or block (defined previously)

$w_{PP-diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus the weight fraction of diblock present in the PE fraction would be weight fraction of PP in the diblock ($w_{PP-diblock}$) multiplied by two. Another way to calculate this is by dividing the weight fraction of PP in the diblock ($w_{PP-diblock}$) by the weight fraction of PP in the whole polymer (equation 2).

To further estimate the amount of diblock present in the whole polymer, the estimated amount of diblock in the PE fraction is multiplied by the weight fraction of the PE fraction measured from HTLC.

To estimate the crystalline block composite index, the amount of diblock copolymer is determined by equation 7. To estimate the CBCI, the weight fraction of diblock in the PE fraction calculated using equation 6 is divided by the overall weight fraction of PP (as calculated in equation 2) and then multiplied by the weight fraction of the PE fraction. The value of the CBCI can range from 0 to 1, wherein 1 would be equal to 100% diblock and zero would be for a material such as a traditional blend or random copolymer.

$$CBCI = \frac{w_{PP-diblock}}{w_{PP}} \cdot w_{PE-fraction} \qquad \text{Eq. 7}$$

Where $w_{PP-diblock}$=weight fraction of PP in the diblock separated with the PE-fraction by HTLC (Equation 6)

$w_{PP}$=weight fraction of PP in the polymer $w_{PE-fraction}$=weight fraction of PE separated from HTLC, containing the diblock and unbound PE (Equation 5)

CBC1 contains a total of 62.5 wt % C3 and is made under conditions to produce a PE polymer with 10 wt % C3 and an iPP polymer containing 97.5 wt % C3, and the weight fractions of PE and PP are 0.400 and 0.600, respectively (as calculated using Equation 2). Since the percent of PE is 40.0 wt % and the iPP is 60.0 wt %, the relative ratio of the PE:PP blocks is expressed as 1:1.5.

Hence, if one skilled in the art carries out an HTLC separation of the polymer and isolates 28 wt % PP and 72 wt % of the PE fraction, this would be an unexpected result and this would lead to the conclusion that a fraction of block copolymer was present. If the C3 content of the PE fraction (wt % $C_{3PE-fraction}$) is subsequently calculated to be 48.9 wt % C3 from equations 4 and 5, the PE fraction containing the additional propylene has 0.556 wt fraction of PE polymer and 0.444 weight fraction of PP polymer ($w_{PP-diblock}$, calculated using Equation 6).

Since the PE fraction contains 0.444 weight fraction of PP, it should be attached to an additional 0.293 weight fraction of PE polymer based on the iPP:PE block ratio of 1.5:1. Thus, the weight fraction of diblock present in the PE fraction is 0.741; further calculation of the weight fraction of diblock present in the whole polymer is 0.533. For the entire polymer, the composition is described as 53.3 wt % iPP-PE diblock, 28 wt % PP polymer, and 18.7 wt % PE polymer. The crystalline block composite index (CBCI) is the estimated weight fraction of diblock present in the whole polymer. For the example described above, the CBCI for the crystalline block composite is 0.533.

Example calculations of CBCI are shown in Table 1 for Example CBC1. Also shown in Table 1 are calculations for an equivalent blend of polymers having the same composition as CBC1 consisting of a CAOP (iPP random) and the CEP (PE random). Note that the calculation of CBCI only applies to CBCs and to blends. For illustrative purposes, the CBCI calculation for the individual iPP or PE random polymer results in a CBCI of zero since it is not possible to have PP in the PE fraction. Therefore, for convention purposes the CBCI of an individual random copolymer is assigned the value of zero based on the intent of the method.

TABLE 1

Example calculations of CBCI

| Line # | Variable | Source | CBC1 | Equivalent Blend | iPP Random | PE Random |
|---|---|---|---|---|---|---|
| 1 | Overall wt % C3 Total | Measured | 62.5 | 62.5 | 97.5 | 10.0 |
| 2 | wt % C3 in PP block/polymer | Measured | 97.5 | 97.5 | 97.5 | 0.0 |
| 3 | wt % C3 in PE block/polymer | Measured | 10.0 | 10.0 | 0.0 | 10.0 |
| 4 | wt fraction PP (in block or polymer) | Eq. 2 | 0.600 | 0.600 | 1.000 | 0.000 |
| 5 | wt fraction PE (in block or polymer) | 1-Line 4 | 0.400 | 0.400 | 0.000 | 1.000 |
| Diblock Analysis of HTLC Separation | | | | | | |
| 6 | wt fraction isolated PP | Measured | 0.280 | 0.600 | 1.000 | 0.000 |
| 7 | wt fraction PE fraction | Measured | 0.720 | 0.400 | 0.000 | 1.000 |
| 8 | wt % C3 in PE-fraction | Eq. 4 | 48.9 | 10.0 | 0 | 10.0 |
| 9 | wt fraction PP-diblock in PE fraction | Eq. 6 | 0.444 | 0.000 | 0 | 0 |
| 10 | wt fraction PE in PE fraction | 1-Line 9 | 0.556 | 1.000 | 1 | 1 |
| 11 | wt fraction diblock in PE fraction | Line 9/Line 4 | 0.741 | 0.000 | 0 | 0 |
| 12 | Crystalline Block Composite Index (CBCI) | Eq. 7 | 0.533 | 0.000 | 0* | 0* |

*Note that the calculation of CBCI only applies to CBCs and to blends.

The Crystalline Block Composite Index (CBCI) provides an estimate of the quantity of block copolymer within the crystalline block composite under the assumption that the ratio of CEB to CAOB within the diblock is the same as the ratio of crystalline ethylene to crystalline alpha-olefin in the overall crystalline block composite. This assumption is valid for these statistical olefin block copolymers based on the understanding of the individual catalyst kinetics and the polymerization mechanism for the formation of the diblocks via chain shuttling catalysis as described in the specification.

The calculation of CBCI is based on the analytical observation that the amount of free CAOP is lower than the total amount of CAOP that was produced in the polymerization. The remainder of the CAOP is bound to CEB to form the diblock copolymer. Because the PE fraction separated by HTLC contains both the CEP and the diblock polymer, the observed amount of propylene for this fraction is above that of the CEP. This difference can be used to calculate the CBCI.

Figure 2:
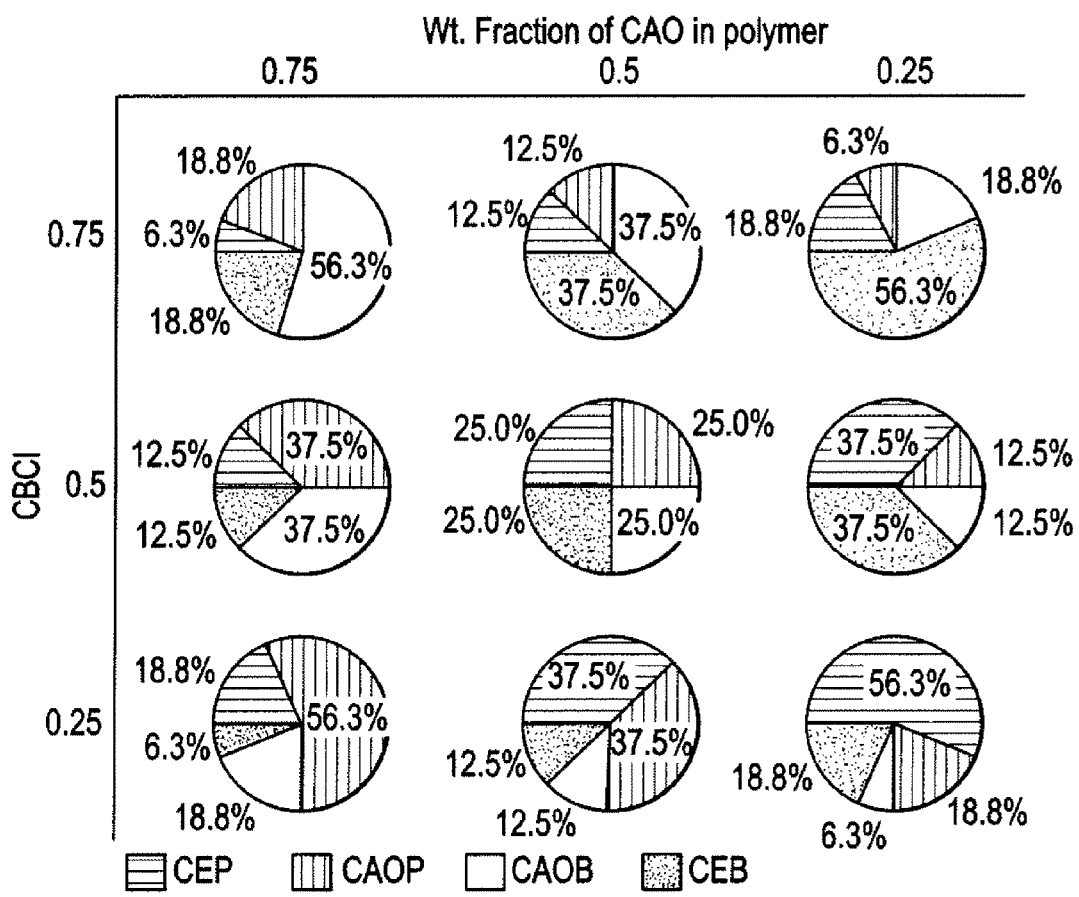
FIG. 2 shows a general graphical representation of the relationship between weight fraction of CAO in the polymer to CBCI.

FIG. 2 shows a general graphical representation of the relationship between weight fraction of CAO in the polymer to CBCI.

Based solely on the analytical observations without prior knowledge of the polymerization statistics, the minimum and maximum quantities of block copolymer present in a polymer can be calculated, thus distinguishing a crystalline block composite from a simple copolymer or copolymer blend.

The upper bound on the amount of block copolymer present within a crystalline block composite, $W_{DB_{Max}}$, is obtained by subtracting the fraction of unbound PP measured by HTLC from one as in Equation 8. This maximum assumes that the PE fraction from HTLC is entirely diblock and that all crystalline ethylene is bound to crystalline PP with no unbound PE. The only material in the CBC that is not diblock is that portion of PP separated via HTLC.

$$W_{DB_{max}} = 1 - w_{PP_{isolated}} \qquad \text{Eq. 8}$$

The lower bound on the amount of block copolymer present within a crystalline block composite, $W_{DB_{min}}$, corresponds to the situation where little to no PE is bound to PP. This lower limit is obtained by subtracting the amount of unbound PP as measured by HTLC from the total amount of PP in the sample as shown in Equation 9.

$$W_{DB_{min}} = W_{PP} - W_{PP_{isolated}} \qquad \text{Eq. 9}$$

Furthermore, the crystalline block composite index will fall between these two values: $W_{DB_{min}} < \text{CBCI} \leq W_{DB_{Max}}$. Table 2 shows the bounds on diblock content for the examples. Because each of these examples contain a lower bound on diblock weight fraction, $W_{DB_{min}}$, that is significantly greater than zero, all of these samples are crystalline block composites.

zero. Finally if this analysis is applied to a sample of PE that does not contain PP then both the weight fraction of PP and weight fraction PP recovered via HTLC are zero and the lower bound on diblock, Equation 9, is zero. Because the lower bound on diblock content is not greater than zero in any of these three cases, these materials are not crystalline block composites.

EXAMPLES

Crystalline Block Composite

General

Catalyst-1 ([[rel-2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl-hafnium) and cocatalyst-1, a mixture of methyldi($C_{14-18}$alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2., are purchased from Boulder Scientific and used without further purification.

CSA-1 (diethylzinc or DEZ) and cocatalyst-2 (modified methylalumoxane (MMAO)) were purchased from Akzo Nobel and used without further purification. The solvent for the polymerization reactions is a hydrocarbon mixture (ISOPAR®E) obtainable from ExxonMobil Chemical Company and purified through beds of 13-X molecular sieves prior to use.

The crystalline block composite of the present Examples are designated CBC1, CBC2 and CBC3.

CBC1, CBC2 and CBC3 are prepared using two continuous stirred tank reactors (CSTR) connected in series. Each reactor is hydraulically full and set to operate at steady state conditions. Monomers, solvent, catalyst-1, cocatalyst-1, and

TABLE 2

| Example | Wt % PP from HTLC Separation | Wt % fraction PP Hard | Wt % fraction PE | Lower Bound on Diblock Wt % ($w_{DB_{Min}}$) | Upper Bound on Diblock Wt %, ($w_{DB_{Max}}$) | Estimated Wt % Diblock |
|---|---|---|---|---|---|---|
| CBC1 | 28 | 60 | 40 | 32 | 72 | 53.3 |
| CBC2 | 13 | 49 | 51 | 36 | 87 | 72.9 |
| CBC3 | 17 | 49 | 51 | 32 | 83 | 65.7 |

Based on the polymerization mechanism for production of the crystalline block composites, the CBCI represents the best estimate of the actual fraction of diblock copolymer in the composite. For unknown polymer samples, $w_{DB_{min}}$ can be used to determine if a material is a crystalline block composite. Consider the application of this analysis to homopolymers, copolymers or blends. For a physical blend of PE and PP, the overall weight fraction of PP should be equal to that of the wt % PP from HTLC and the lower bound on diblock content, Equation 9, is zero. If this analysis is applied to a sample of PP that does not contain PE, both the weight fraction of PP and amount of PP obtained from HTLC are 100% and again the lower bound on diblock content, Equation 9, is CSA-1 are flowed to the first reactor according to the process conditions outlined in Table 3. The first reactor contents as described in Table 3 are flowed to a second reactor in series. Additional catalyst-1 and cocatalyst-1 are added to the second reactor, as well as a small amount of MMAO as a scavenger. Hydrogen flow in the first reactor for CBC1 is 12 sccm and for CBC2 and CBC3 is 10 sccm. The concentration of the DEZ solution is maintained at 30000 ppm and added only to the first reactor. Cocatalyst-1 concentration for the first reactor for CBC1 is 149 ppm and for CBC2 and CBC3 is 50 ppm. Cocatalyst-2 concentration for the first reactor for CBC1 is 1993 ppm and for CBC2 and CBC3 is 1500 ppm.

TABLE 3

Reactor process conditions to produce crystalline block composite CBC1, CBC2, CBC3

First Reactor Conditions

| Example | Reactor Control Temp. (° C.) | Solvent Feed (lb/hr) | Propylene Feed (lb/hr) | Ethylene Feed (lb/hr) | Reactor Propylene Conc. (g/L) | Catalyst Efficiency ($g_{Poly}/g_M$) * $10^6$ | Catalyst Flow (lb/hr) | Catalyst Conc. (ppm) | Cocatalyst-1 Flow (lb/hr) | Cocat.-2 Flow (lb/hr) | DEZ Flow (lb/hr) | Production Rate (lb/hr) |
|---|---|---|---|---|---|---|---|---|---|---|---|---|
| CBC1 | 105 | 229 | 2 | 18 | 1.08 | 2.40 | 0.28 | 29 | 0.44 | 0.45 | 0.73 | 11 |
| CBC2 | 118 | 145 | 2.3 | 27.8 | 1.04 | 5.12 | 1.16 | 5 | 1.50 | 0.91 | 1.10 | 29 |
| CBC3 | 119 | 145 | 2.3 | 26.9 | 1.08 | 10.26 | 0.56 | 5 | 0.70 | 0.61 | 0.74 | 28 |

Second Reactor Conditions

| Example | Reactor Control Temp. (° C.) | Solvent Feed (lb/hr) | Propylene Feed (lb/hr) | Ethylene Feed (lb/hr) | Reactor Propylene Conc. (g/L) | Catalyst Efficiency ($g_{Poly}/g_M$) * $10^6$ | Catalyst Flow (lb/hr) | Catalyst Conc. (ppm) | Cocatalyst-1 Flow (lb/hr) | Production Rate (lb/hr) |
|---|---|---|---|---|---|---|---|---|---|---|
| CBC1 | 93 | 343 | 32 | 0 | 1.97 | 0.44 | 0.66 | 100 | 0.66 | 34 |
| CBC2 | 110 | 145 | 31 | 0 | 2.03 | 0.16 | 0.95 | 200 | 0.93 | 31 |
| CBC3 | 110 | 150 | 31 | 0 | 1.77 | 0.18 | 0.86 | 200 | 0.84 | 31 |

Table 4 shows the analytical characteristics of CBC1, CBC2, and CBC3.

TABLE 4

Crystalline block composite physical properties

| Example | Wt % PP from HTLC Separation | Mw Kg/mol | Mw/Mn | Wt % $C_2$ | Tm (° C.) Peak 1 (Peak 2) | Tc (° C.) | Melt Enthalpy (J/g) | Tg (° C.) |
|---|---|---|---|---|---|---|---|---|
| CBC1 | 28.0 | 151 | 2.9 | 37.5 | 127 (110) | 95 | 97 | −24 |
| CBC2 | 13.2 | 146 | 2.8 | 46.7 | 130 (114) | 97 | 126 | −11 |
| CBC3 | 16.9 | 215 | 3.4 | 46.1 | 131 (113) | 93 | 125 | −12 |

Table 5 shows the ratio of iPP to PE in CBC1, CBC2, and CBC3 as well as the estimated crystalline block composite index.

TABLE 5

Block Composite Index Estimation

| Sample | wt fraction iPP | wt fraction PE | Crystalline Block Composite Index |
|---|---|---|---|
| CBC1 | 60 | 40 | 0.533 |
| CBC2 | 49 | 51 | 0.729 |
| CBC3 | 49 | 51 | 0.657 |

Figure 3:
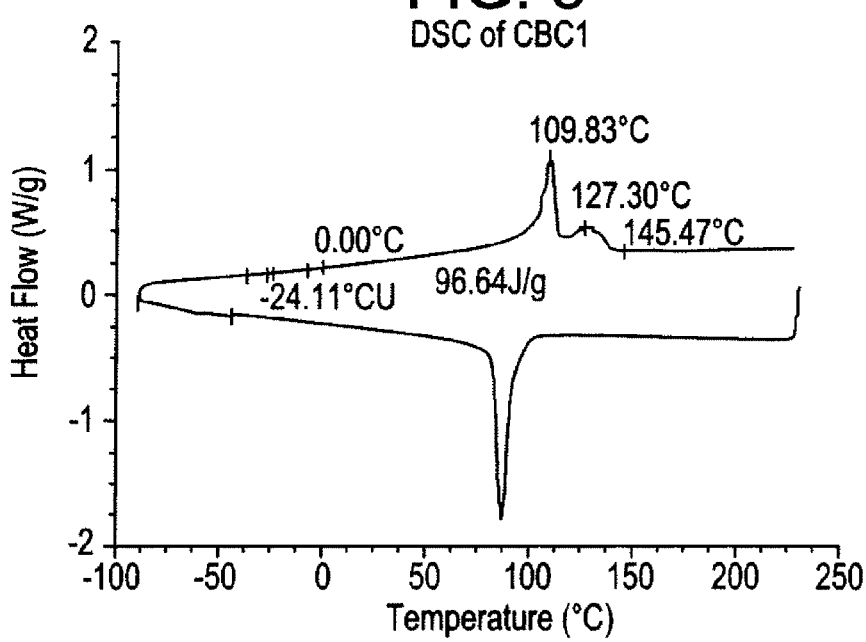
FIG. 3 shows DSC curves for CBC1.

FIG. 3 shows the DSC profile for CBC1. The DSC profile shows a melting peak at 127° C. which is representative of the CAOP and CAOB and 110° C. which corresponds to the CEP and CEB. The observed melt enthalpy was 96 J/g and glass transition temperatures were observed at 0 and −24° C. The crystallization temperature was measured at 90° C. Surprisingly, the crystallization temperature of CBC1 is closer to that of the CEP than the CAOP.

FIG. 1 shows the TREF analysis of CBC1. The TREF elution profile shows that CBC1 is highly crystalline and in contrast to the DSC melting profile, shows little or no separation of the CEP and CAOP or the block copolymer. Only 2.4 wt % purge was measured which also indicates the very high crystallinity of components in CBC1.

Figure 4:
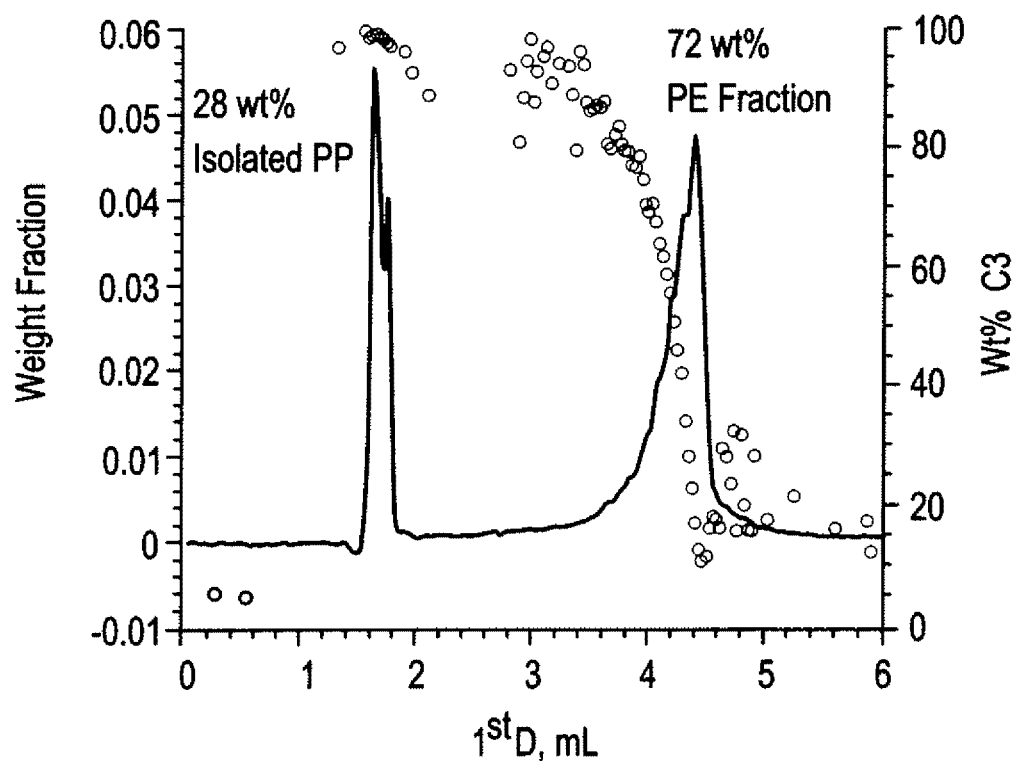
FIG. 4 shows HTLC analysis of CBC1.

FIG. 4 shows HTLC analysis of CBC1. The elution profile of CBC1 by HTLC showed that 28 wt % of an early eluting peak between 1-2mL and 72 wt % of a later eluting peak between 3-6 mL were eluted. From the concentration and composition measurement, it is determined that the early eluting peak was isolated PP which is CAOP and representative of the CAOB. This is shown by the composition profile of the wt % of C3 present. The second peak and later eluting peak is rich in C2 and shows a gradient of C3. It can be interpreted that this peak is the PE fraction and contains the block copolymer and CEP. The composition gradient shows that the block copolymer is eluted earlier and the CEP is eluted last.

Figure 5:
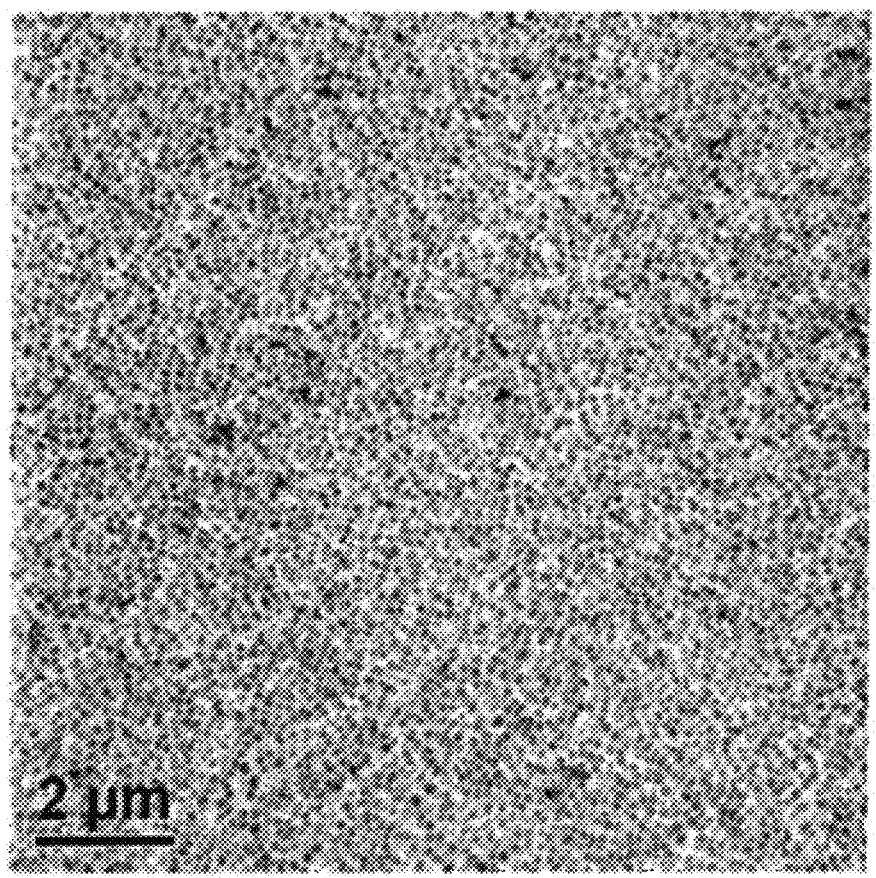
FIG. 5 shows an TEM micrograph of CBC1 at 2 μm resolution.
Figure 6:
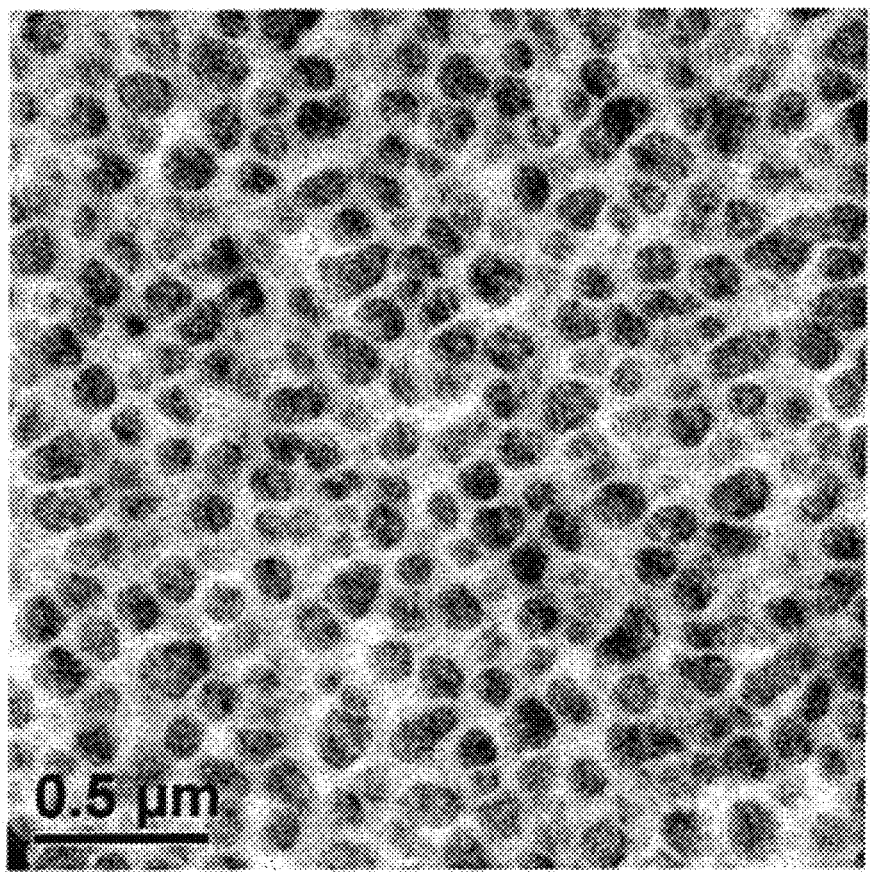
FIG. 6 shows an TEM micrograph of CBC1 at 0.5 μm resolution.
Figure 7:
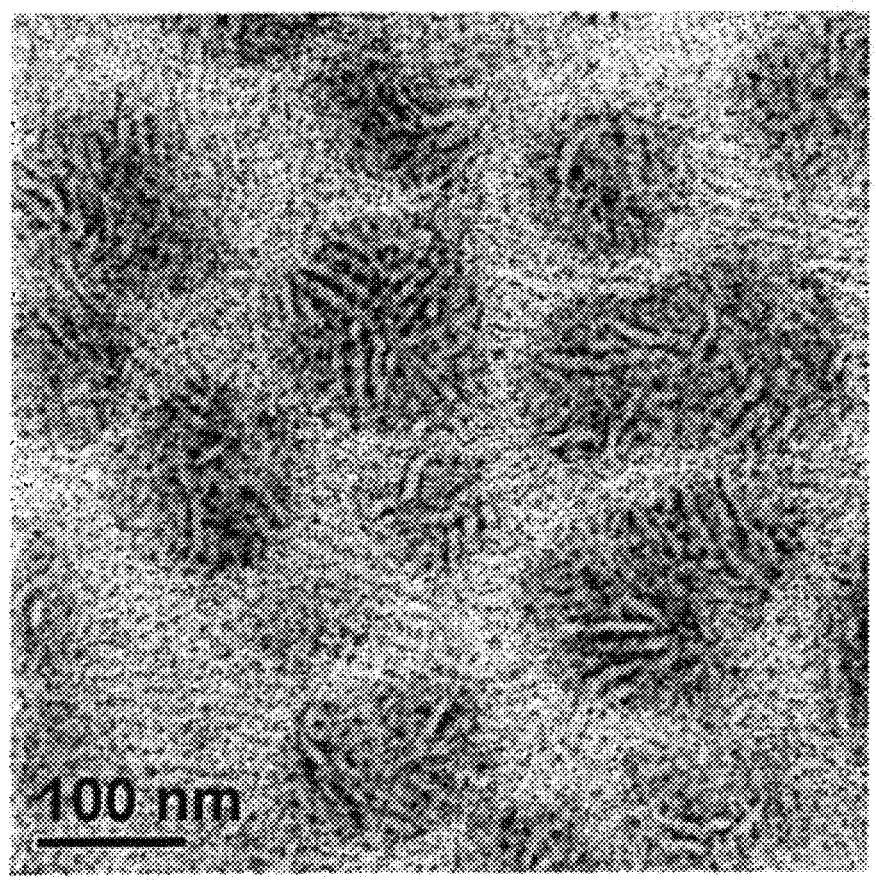
FIG. 7 shows an TEM micrograph of CBC1 at 100 nm resolution.

FIG. 5 is a TEM micrograph showing the morphology of CBC1 at 2 µm resolution. FIG. 6 shows the morphology at 0.5 µm and FIG. 7 shows it at 100 nm Based on the staining applied, the darker domains are PE and the lighter domains are PP. The very small PE domain size of this composition strongly suggests the presence of high levels of block copolymers which acted to compatibilize the PP and PE phases. The spherical and nano-scale nature indicated that the block copolymer was effective in reducing the PE domains. Standard polymer/polymer blends of polypropylene and polyethylene exhibit gross and phase separated morphologies with an order of magnitude higher domain size.

PP/HDPE Toughening

ELITE Enhanced Polyethylene 5960G (The Dow Chemical Company) (1.0 MI, 0.962 g/cc) is used as a high density polyethylene component in the blends and is designated as HDPE.

Polypropylene D221.00 (The Dow Chemical Company) (35 MFR, 0.900 g/cc) is used as a polypropylene component in the blends and is designated as PP1.

Polypropylene H110N (The Dow Chemical Company) (2 MFR, 0.900 g/cc) is used as a polypropylene component in the blends and is designated as PP2.

The compounded blends were prepared on a using a Werner-Phleider Coperion ZSK-25mm Twin Screw Extruder.

The compounds were mixed between 200-240° C. at 500 rpm at a rate of 50 lb/hr. During that time, gravimetric feeders are monitored to ensure that the correct blend ratios are at a steady state. The polymer strands from the extruder are water quenched in a water bath and then pelletized.

Table 6 shows the components of HDPE/PP/CBC1 blends of the present Examples.

TABLE 6

PP/HDPE/CBC1 Formulations

| Raw Material Description | Blend A | Blend 1 | Blend 2 | Blend B | Blend 3 | Blend 4 |
|---|---|---|---|---|---|---|
| PP1 | 70.0 | 70.0 | 45.0 | — | — | — |
| HDPE | 30.0 | 20.0 | 45.0 | 30.0 | 20.0 | 45.0 |
| CBC1 | — | 10.0 | 10.0 | — | 10.0 | 10.0 |
| PP2 | — | — | — | 70.0 | 70.0 | 45.0 |
| Irganox B225 (0.2%) | 0.20 | 0.20 | 0.20 | 0.20 | 0.20 | 0.20 |
| Total Weight % | 100.2 | 100.2 | 100.2 | 100.2 | 100.2 | 100.2 |

Figure 8A:
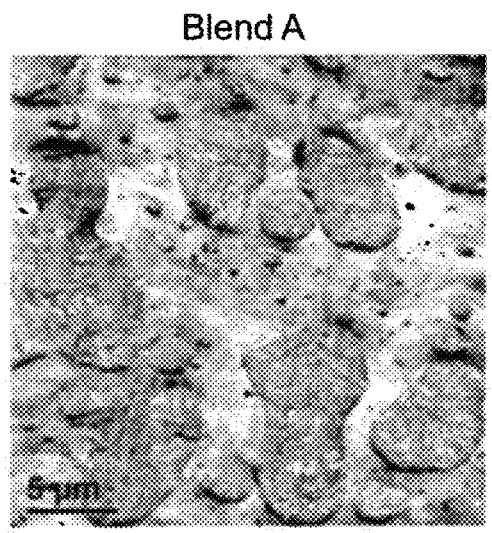
FIG. 8 shows a morphology comparison of PP/HDPE Blend A to Blend 1, which is compatibilized with CBC1.
Figure 8B:
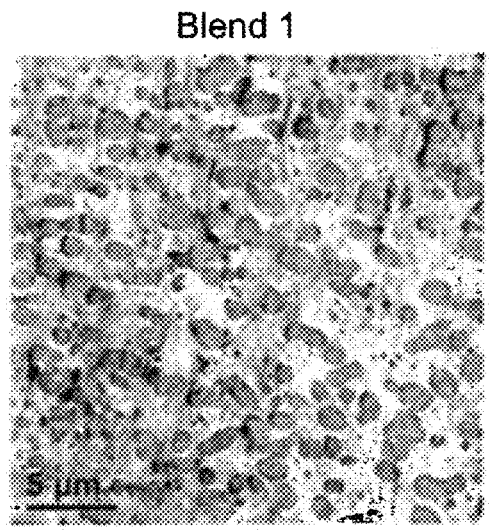

FIG. 8 shows the solid state morphologies of Blend A and Blend 1. Surprisingly, the size of the HDPE domains is significantly reduced when compared to that of the uncompatibilized blend. In this particular example, the size of the HDPE domains in Blend 1 are less than 1.5 microns and are well-dispersed when compared to the large (greater than 5 μm) and globular domains present in the uncompatibilized blend, Blend A.

Table 7 shows the physical properties of the blends of the present Examples.

TABLE 7

Physical Properties of HDPE/PP/CBC1 Formulations

| Blend | MFR | Flex Mod (Mpa) | RT Izod Impact Strength (KJ/m²) | Clarity % | Haze % | Transmittance | 60° Gloss (%) | Avg Modulus (MPa) | % Strain @ Break | Stress @ Break (MPa) |
|---|---|---|---|---|---|---|---|---|---|---|
| Blend A | 17.8 | 1482 | 4.1 | 3.9 | 100 | 50 | 23.8 | 1575 | 10 | — |
| Blend 1 | 20 | 1420 | 5.4 | 4 | 100 | 51 | 41.3 | 1287 | 229 | — |
| Blend 2 | 10.6 | 985 | 5.3 | 21 | 99 | 75 | — | 1038 | 171 | 14 |
| Blend B | 2.1 | 1388 | 5.5 | 87 | 86 | 70 | — | 991 | 93 | 11 |
| Blend 3 | 2.1 | 1323 | 6.0 | 92 | 70 | 75 | — | 971 | 109 | 18 |
| Blend 4 | 2.0 | 1098 | 13.3 | 81 | 87 | 64 | — | 850 | 112 | 12 |

Figure 9:
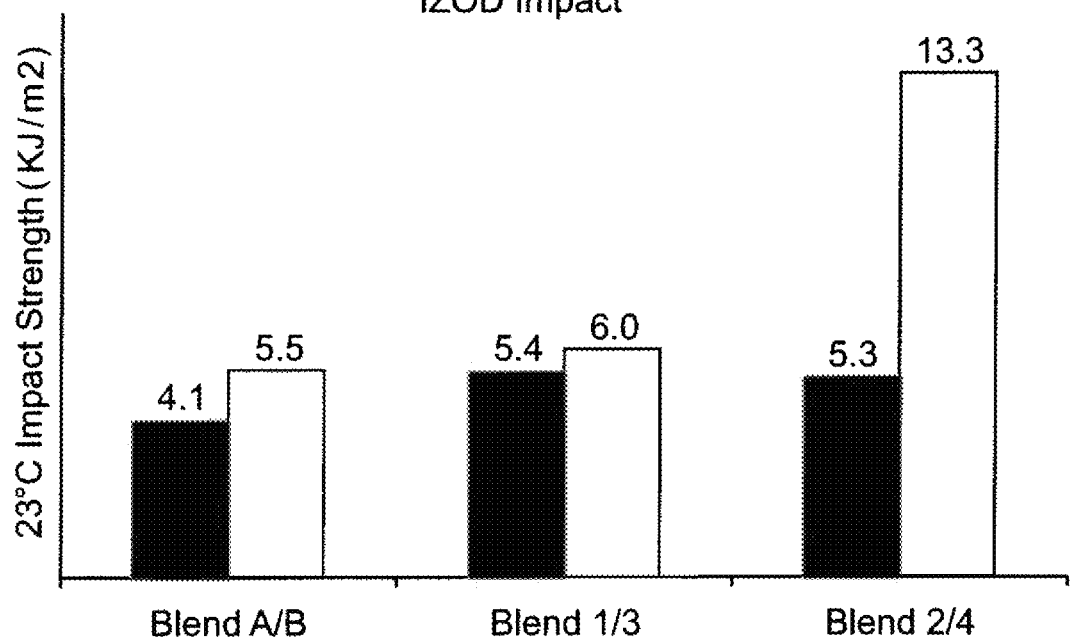
FIG. 9 shows an Impact Strength Comparison of PP/HDPE Blends compatibilized with CBC1 with those that are not compatibilized.

FIG. 9 compares the impact strength of comparative Blends A and B to that of inventive Blends 1-4. Surprisingly, the compatibilized blends, Blend 1 and Blend 2 exhibited a 30% improvement in room temperature IZOD impact strength over the comparative Blend A. Blend 3 also showed improvement over the comparative Blend B, but Blend 4 showed striking improvement over the comparative Blend B.

Figure 10:
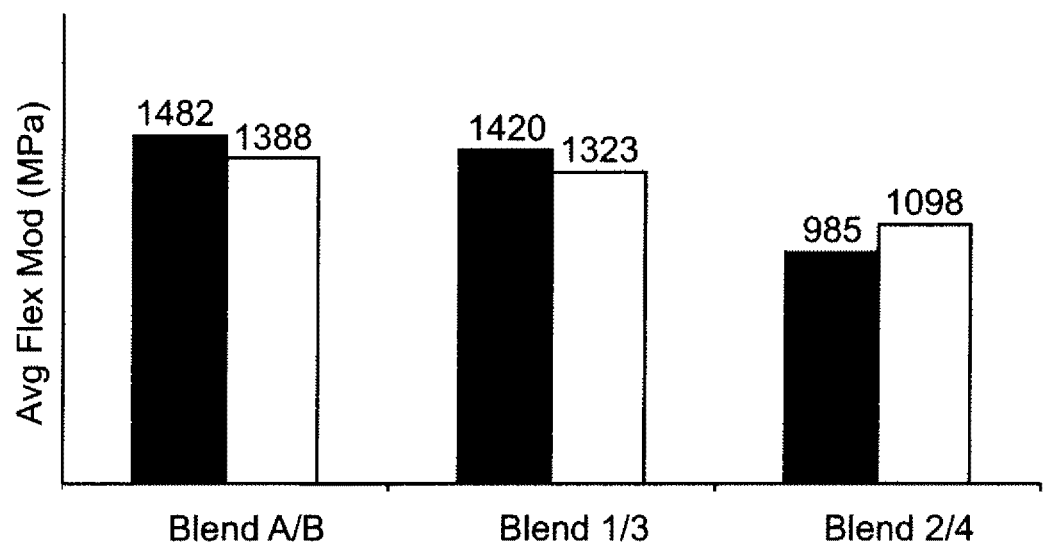
FIG. 10 shows a Flexural Modulus Comparison of PP/HDPE Blends compatibilized with CBC1 with those that are not compatibilized.

FIG. 10 compares the Flexural Modulus of the comparative Blend A and Blend B to the inventive Blends 1-4. Surprisingly, the modulus of the blends are similar despite the inventive blends having a 30% or more increase in impact strength.

Figure 11:
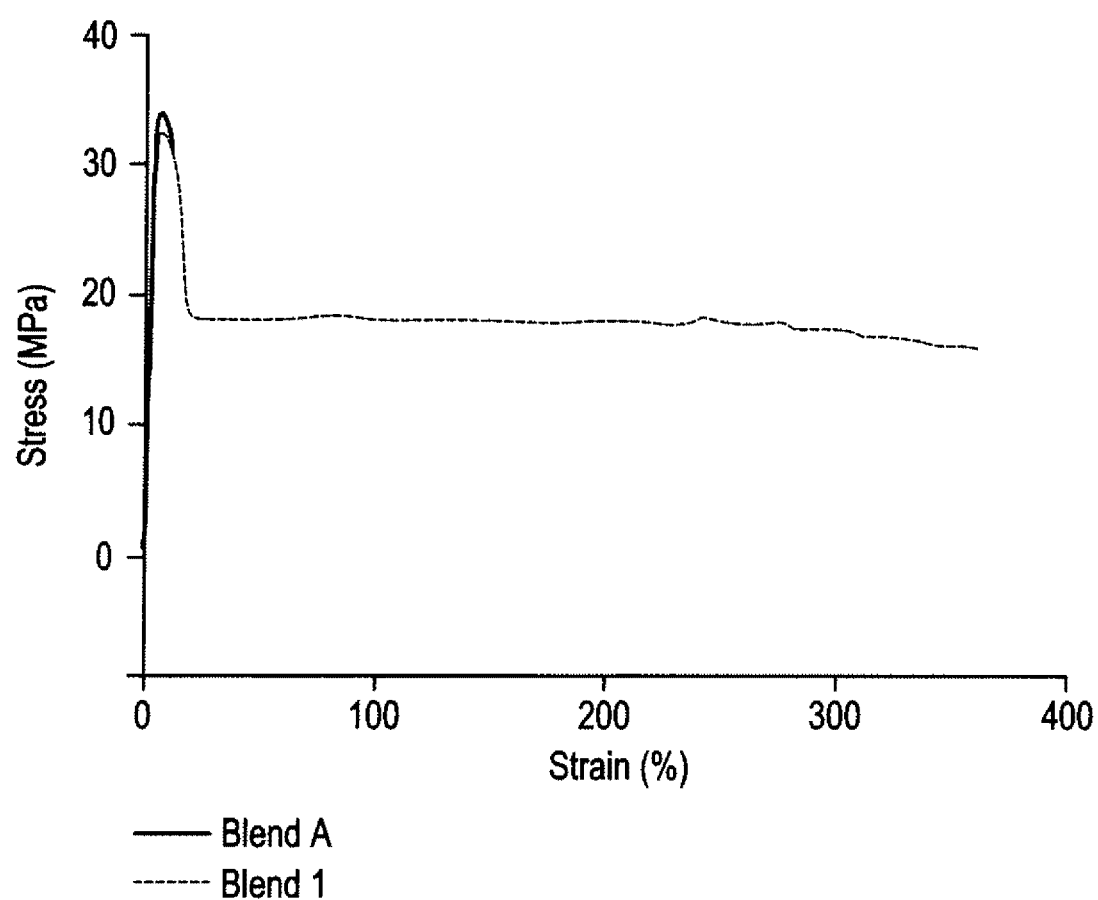
FIG. 11 shows a Tensile Property Comparison of PP/HDPE Blends compatibilized with CBC1 with those that are not compatibilized.

FIG. 11 shows that the compatibilized PP/HDPE Blend 1 has considerably higher tensile elongation and toughness when compared to that of the uncompatibilized Blend A.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. The appended claims intend to cover all those modifications and variations as falling within the scope of the invention.

We claim:

1. A composition comprising:
   A) a first crystalline alpha-olefin based polymer wherein the polymer is polypropylene;
   B) a first crystalline ethylene based polymer wherein the polymer is polyethylene; and,
   C) at least one crystalline block composite having a Crystalline Block Composite Index of 0.1 to 0.9 comprising:
      i) a second crystalline ethylene based polymer;
      ii) a second crystalline alpha-olefin based polymer wherein the polymer is polypropylene and
      iii) a block copolymer comprising a crystalline ethylene block and a crystalline alpha-olefin block wherein the crystalline ethylene block of the block copolymer is the same composition as the crystalline ethylene based polymer in the block composite and the crystalline alpha-olefin block of the block copolymer is the same composition as the crystalline alpha-olefin based polymer of the block composite
   wherein component C) is present in an amount of from 0.5 wt % to 15 wt % based on total weight of the composition.

2. The composition of claim 1 wherein component B) is selected from the group consisting of HDPE, LDPE and LLDPE.

3. The composition of claim 1 wherein component A) is present in an amount greater than 45 wt % based on total weight of the composition.

4. The composition of claim 1 wherein the Izod Impact Strength measured at room temperature according to ASTM D256 is at least 5% greater than that of the composition with components A) and B) but lacking C).

5. The composition of claim 4 wherein the average modulus measured according to ASTM D790 is no lower than 35% of the value for the composition with components A) and B) but lacking C).

* * * * *